United States Patent
Lee et al.

(10) Patent No.: US 9,083,874 B2
(45) Date of Patent: Jul. 14, 2015

(54) CAMERA MODULE

(71) Applicant: LG INNOTEK CO., LTD., Seoul (KR)

(72) Inventors: SungGuk Lee, Seoul (KR); Taejin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/099,297

(22) Filed: Dec. 6, 2013

(65) Prior Publication Data

US 2014/0160310 A1   Jun. 12, 2014

(30) Foreign Application Priority Data

Dec. 12, 2012 (KR) .................. 10-2012-0144886

(51) Int. Cl.
*H04N 5/228* (2006.01)
*H04N 5/225* (2006.01)
*H04N 5/232* (2006.01)

(52) U.S. Cl.
CPC ........... *H04N 5/2257* (2013.01); *H04N 5/2328* (2013.01)

(58) Field of Classification Search
CPC ..................... H04N 5/2257; H04N 5/2328
USPC ......... 348/208.7, 373–374, 208.99, 294, 335, 348/340; 250/208.1; 257/432–434; 359/811, 819, 823–824
See application file for complete search history.

(56) References Cited

U.S. PATENT DOCUMENTS

| 2010/0149354 | A1* | 6/2010 | Makimoto et al. ....... 348/208.99 |
| 2011/0285890 | A1* | 11/2011 | Choi et al. .................... 348/308 |
| 2013/0107068 | A1 | 5/2013 | Kim et al. |
| 2013/0107112 | A1 | 5/2013 | Oh |

* cited by examiner

*Primary Examiner* — Mekonnen Dagnew

(57) ABSTRACT

An exemplary embodiment of the present disclosure includes a first PCB Printed Circuit Board mounted with an image sensor, a housing unit arranged on an upper portion of the first PCB, a holder module spaced apart from an inner bottom surface of the housing unit at a predetermined distance, wound on a periphery with a first coil and having at least one lens thereinside, a second PCB mounted on an upper portion of the holder module, a plate member coupled to a bottom surface of the holder module, a plurality of wire springs connected at one end to the second PCB and connected at the other end to the plate member, and a coil fixing unit configured to fixedly position the first coil to a periphery of the holder module.

14 Claims, 5 Drawing Sheets

CAMERA MODULE

Pursuant to 35 U.S.C.§119 a, this application claims the benefit of earlier filing date and right of priority to Korean Patent Application No.10-2012-0144886, filed on Dec. 12, 2012, the contents of which are hereby incorporated by reference in their entirety.

BACKGROUND OF THE DISCLOSURE

1. Field of Endeavor

The teachings in accordance with exemplary and non-limiting embodiments of this disclosure relate generally to a camera module.

2. Background

This section provides background information related to the present disclosure which is not necessarily prior art.

Generally, a miniaturized and low-powered camera module is difficult to be applied with such technology as VCM Voice Coil Motor technology used to be applied to conventional camera modules, and related researches to solve the abovementioned problem have been briskly waged.

A camera module mounted on a small electronic product such as a smart phone may be frequently susceptible to shocks in use, and may be finely shaken in use by handshake of a user. In consideration of these problems, development of a camera module additionally equipped with a handshake compensation optical image stabilizing function is recently required.

An OIS Optical Image Stabilizer module is largely divided into a lens shift type OIS module configured to horizontally move a lens along an object moving to X and Y axes, a sensor shift type OIS module configured to horizontally move an image sensor, and a module tilt type OIS module configured to horizontally move an AF Auto Focus module.

The lens shift method is to additionally shake a Z-axis moving lens unit to X and Y axes, whereby a space is required inside an AF module to shake the X and Y axes. The lens shift method is configured to connect an FPCB Flexible Printed Circuit Board to an AF module, so that there is no problem of connecting the AF module to the PCB. However, there is a disadvantage in that an optical axis of optical system is shaken because the lens unit is horizontally shaken inside the AF module.

Meanwhile, it is very difficult to assemble an outer blade which is an injection molding product and a coil due to miniaturization of an OIS actuator of lens shift method. That is, an assembly space for the outer blade and the coil is insufficient due to miniaturization of device to make insufficient a space for coating a sufficient amount of adhesive for adhering and fixing the coil, whereby the coil may be disengaged from an installation surface of the outer blade when an assembly process is performed before complete curing of the adhesive.

Another disadvantage is that inputted adhesive may overflow to contaminate an outside of the outer blade and surrounding parts when an inputted amount of adhesive is increased to prevent the coil from being disengaged.

SUMMARY OF THE DISCLOSURE

This section provides a general summary of the disclosure, and is not a comprehensive disclosure of its full scope or all of its features.

Exemplary and non-limiting embodiments of this disclosure are to provide a camera module having an OIS Optical Image Stabilizer function. Another object is to provide a structure-improved camera module configured to tightly adhere and fix a coil to an outer blade.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a camera module, the camera module comprising: a first PCB Printed Circuit Board mounted with an image sensor;

a housing unit arranged on an upper portion of the first PCB;

a holder module spaced apart from an inner bottom surface of the housing unit at a predetermined distance, wound on a periphery with a first coil and having at least one lens thereinside;

a second PCB mounted on an upper portion of the holder module;

a plate member coupled to a bottom surface of the holder module;

a plurality of wire springs connected at one end to the second PCB and connected at the other end to the plate member; and a coil fixing unit configured to fixedly position the first coil to a periphery of the holder module.

Preferably, but not necessarily, the holder module may include an outer blade configured to be wound with the first coil at a periphery, and a bobbin centrally arranged at the outer blade, arranged with the lens at an inside and fixed with a second coil at a periphery.

Preferably, but not necessarily, the coil fixing unit may include a plurality of fixing protrusions each formed at a periphery of the outer blade, a coil reception groove formed at one surface of the outer blade to have a first depth, and an adhesive input groove formed among the fixing protrusions to have a second depth.

Preferably, but not necessarily, the fixing protrusion may be insertedly coupled to a through hole centrally formed at the first coil.

Preferably, but not necessarily, the adhesive input groove may be formed at a position corresponding to that of the through hole.

Preferably, but not necessarily, an adhesive inputted to the adhesive input groove may be infused into a space formed between the coil reception groove and the first coil.

Preferably, but not necessarily, the housing unit may include a first housing arranged at an upper portion of the first PCB, a second housing arranged on the upper portion of the first PCB and mounted an upper surface with the second PCB, first and second permanent magnets interposed between the first and second housings, and a yoke arranged between the first and second permanent magnets, or positioned between inner surfaces of the first and second housings to transmit a magnetic force into the holder module.

Preferably, but not necessarily, the yoke may be protrusively formed at a center portion facing the holder module.

Preferably, but not necessarily, the second housing and the second PCB may be fixed by using a double-sided tape.

Preferably, but not necessarily, the camera module may further comprise a shield can formed with a through hole at a position corresponding to a connection portion between the second PCB and the wire spring, and at a position corresponding to a position of the lens module to thereby wrap the housing unit.

Preferably, but not necessarily, the holder module may include upper and bottom elastic members each arranged at an upper surface and a bottom surface of the bobbin to elastically support the bobbin relative to the outer blade, and a space formed at a center of the first coil to project a magnetic force toward the second coil.

Preferably, but not necessarily, the wire spring may be provided in a metal material and conductively connected to second PCB and the plate member.

Preferably, but not necessarily, at least six wire springs may be provided to supply to the holder module two polarity powers for auto focus control and four polarity powers for OIS driving via connection with the second PCB and the plate member.

Preferably, but not necessarily, a total of eight wire springs may be provided, where a set of two wire springs is respectively arranged at each corner portion of the holder module, each at a same length.

The camera module according to the exemplary embodiments of the present disclosure has an advantageous effect in that a sufficient amount of adhesive is supplied to a first coil mounted at a periphery of an outer blade to prevent the first coil from being disengaged from an installed position, even if an assembly process is performed while the adhesive is not completely cured.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. In the figures, like reference numerals refer to the same or similar elements.

DETAILED DESCRIPTION

Hereinafter, exemplary embodiments of the present disclosure will be described in detail with reference to the accompanying drawings.

Figure 1:
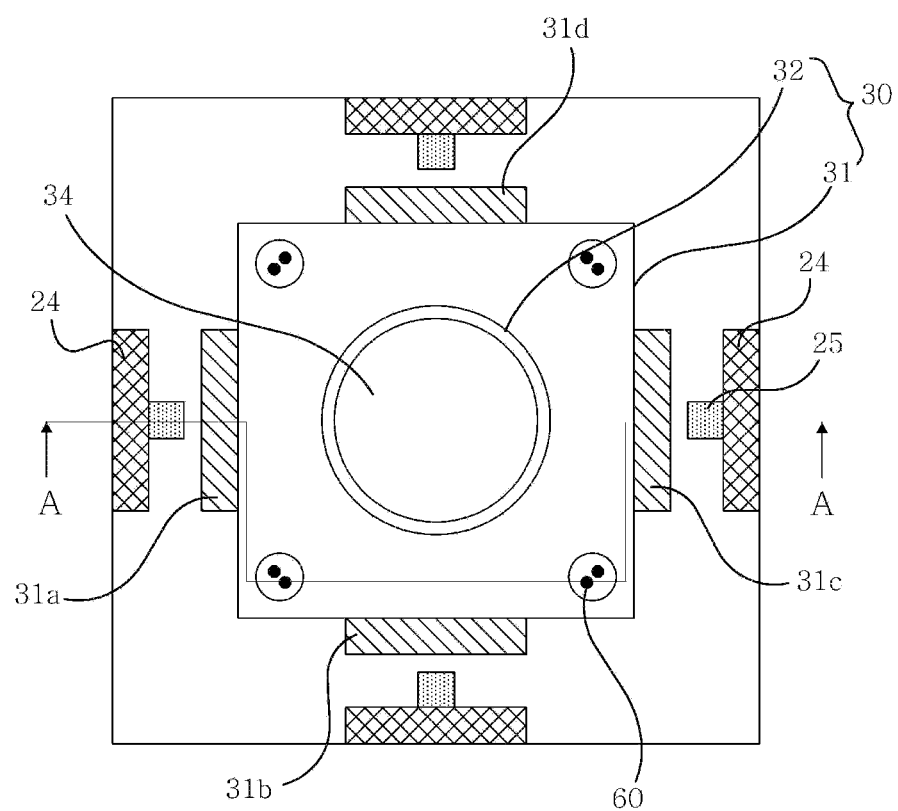
FIG. 1 is a schematic plan view illustrating a camera module according to an exemplary embodiment of the present disclosure.
Figure 2:
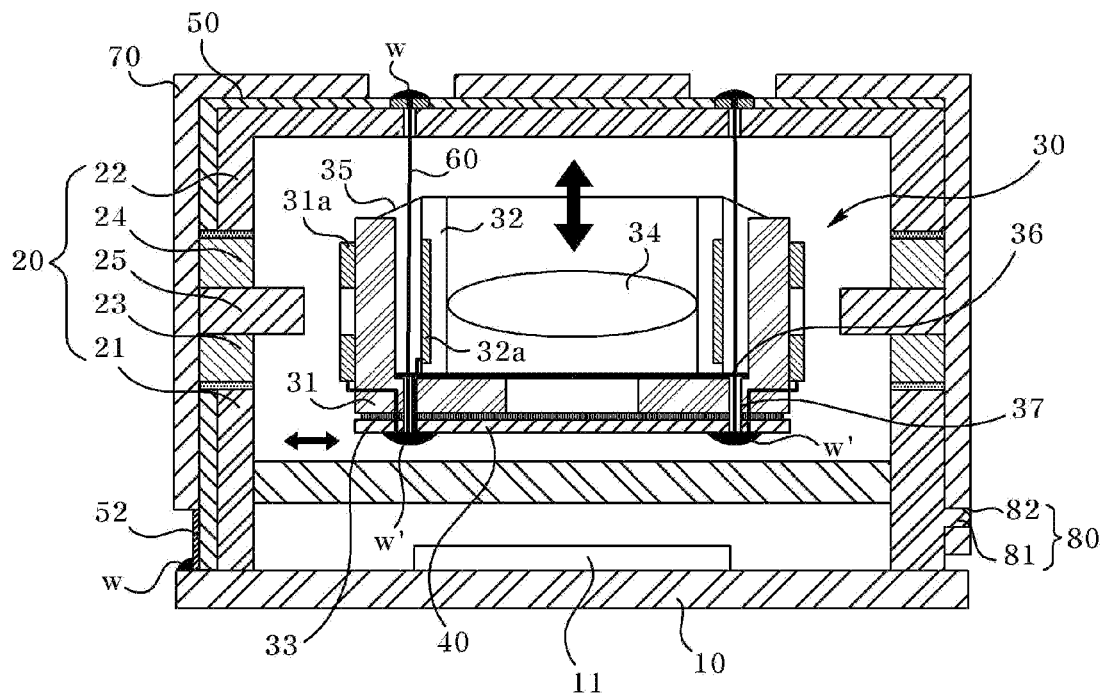
FIG. 2 is a cross-sectional view taken along line "A-A" of FIG. 1.
Figure 3:
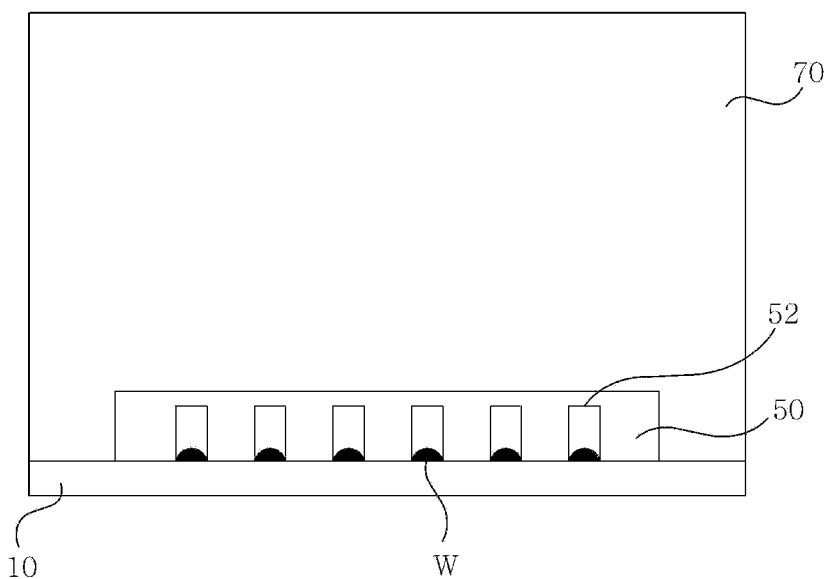
FIGS. 3 and 4 are schematic lateral views illustrating a camera module according to an exemplary embodiment of the present disclosure.
Figure 4:
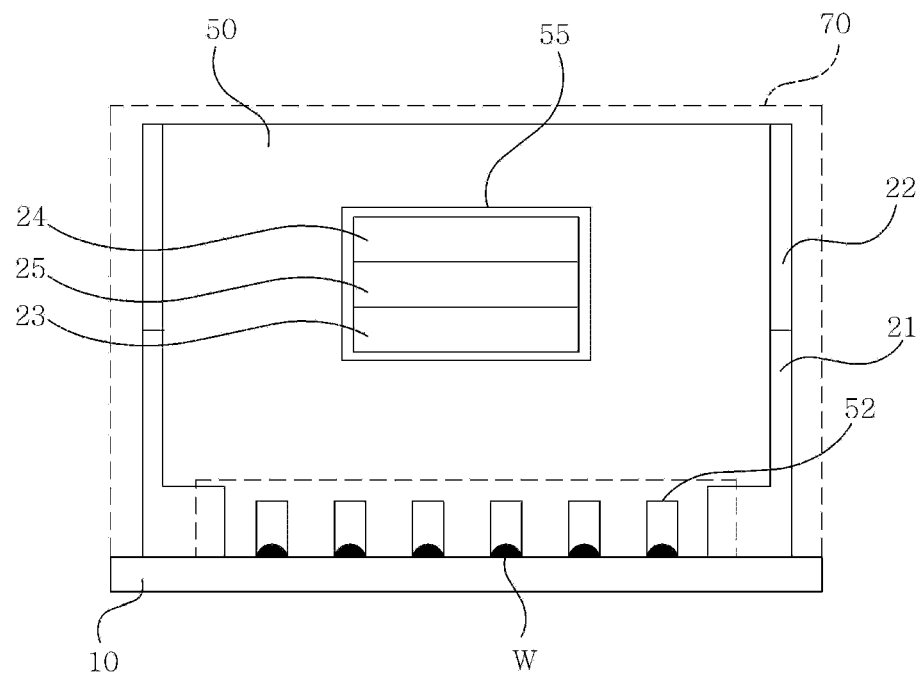
Figure 5:
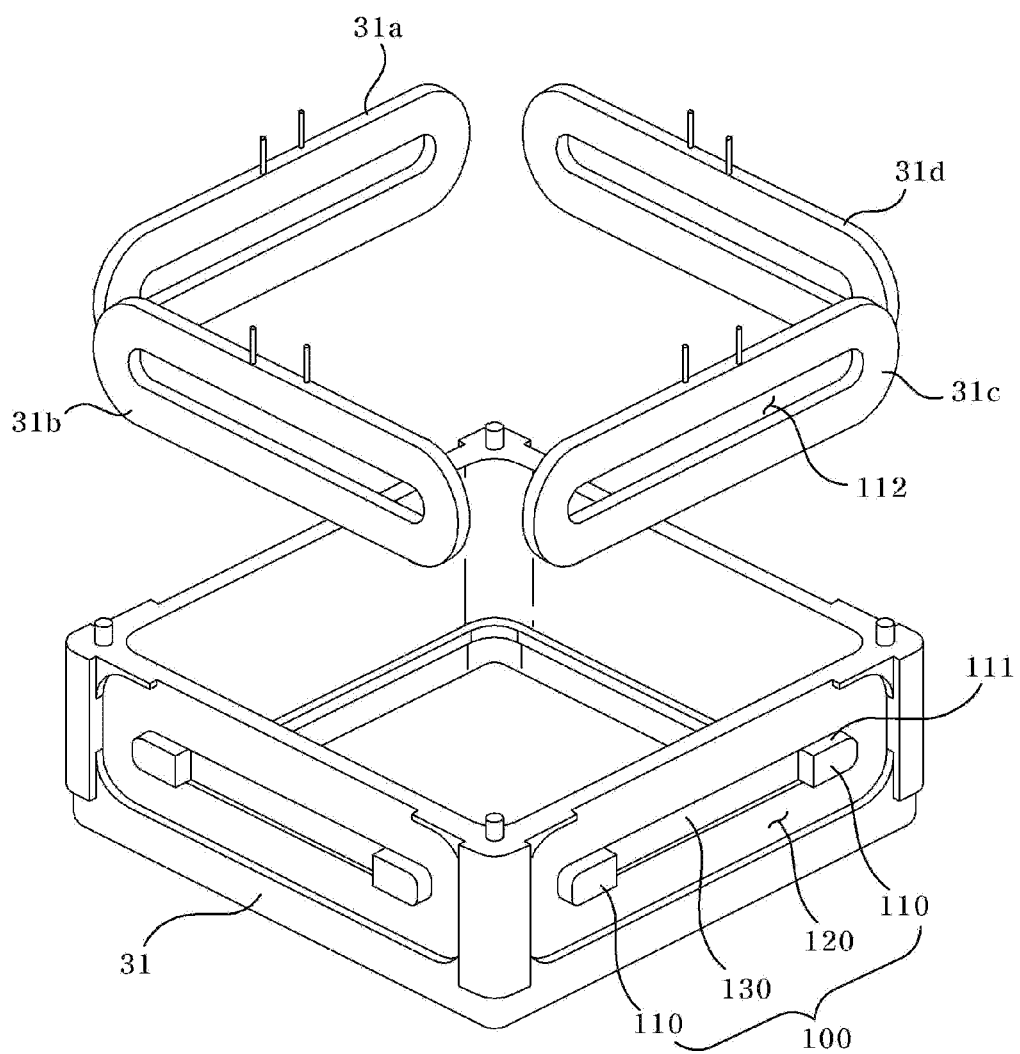
FIG. 5 is an exploded perspective view illustrating a holder module according to an exemplary embodiment of the present disclosure.
Figure 6:
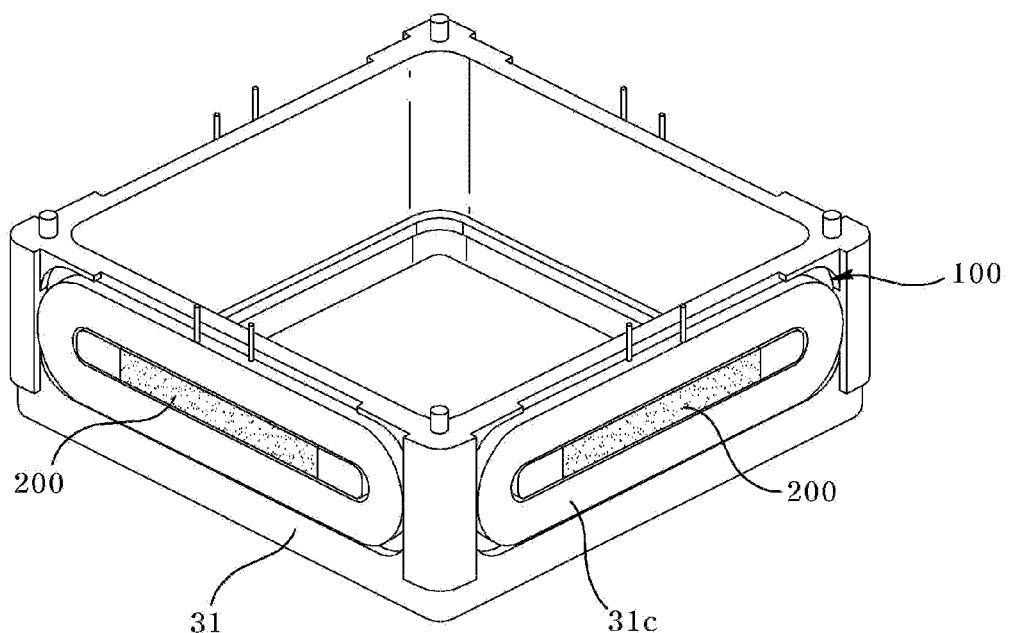
FIG. 6 is an assembled perspective view of FIG. 5.

FIG. 1 is a schematic plan view illustrating a camera module according to an exemplary embodiment of the present disclosure, FIG. 2 is a cross-sectional view taken along line "A-A" of FIG. 1, FIGS. 3 and 4 are schematic lateral views illustrating a camera module according to an exemplary embodiment of the present disclosure, FIG. 5 is an exploded perspective view illustrating a holder module according to an exemplary embodiment of the present disclosure, and FIG. 6 is an assembled perspective view of FIG. 5.

Referring to FIG. 1 of schematic plan view of a camera module and FIG. 2 of schematic cross-sectional view taken along line "A-A" of FIG. 1, the camera module according to an exemplary embodiment of the present disclosure includes a first PCB 10, a housing unit 20, a holder module 30, a plate member 40, a second PCB 50, a wire spring 60 and a coil fixing unit 100.

The first PCB 10 is mounted at an approximate center with an image sensor 11, and preferably provided with a PCB substrate. The first PCB 10 may be arranged with constituent elements for driving the image sensor 11 or may be provided with a plurality of terminals for supplying a power and for outputting information of the image sensor 11.

The housing unit 20 is arranged at an upper portion of the first PCB 10 to form a frame of the camera module. The housing unit 20 according to an exemplary embodiment of the present disclosure includes a first housing 21, a second housing 22, first and second permanent magnets 23, 24 and a yoke 25.

The first housing 21, which is a base, may be arranged at an upper portion of the first PCB 10 and may be spaced apart from the image sensor 11 at a predetermined distance. The first housing 21 may be further mounted with a filter member configured to filter an image incident from the image sensor 11, if necessary.

The second housing 22 may be arranged at an upper portion of the first housing 21 to cover the first housing 21. An opening may be formed at a position corresponding to a position of an approximate central vicinity of the second housing 22 to transmit an image toward the image sensor 11. The second housing 22 may be attached and fixed at an upper surface thereof to the second PCB 50, described later by a double-sided tape or an adhesive. However, the present disclosure is not limited thereto, and it is possible to fix the second PCB 50 to an inner surface of a separate third housing such as a case or a shield can inside the second PCB 50 depending on product design. When a third housing is provided, the second PCB 50 may be pressed and supported by the third housing without a separate fixing member.

The first and second permanent magnets 23, 24 may be interposed between the first and second housings 21, 22 to project a magnetic force to the holder module 30. The first and second permanent magnets 23, 24 may be provided with a same size. Furthermore, the first and second permanent magnets 23, 24 and the yoke 25 may be arranged at an inner surface of the first and second housings within a design-allowable scope.

Meanwhile, when the sizes of the first and second permanent magnets 23, 24 increase, an OIS driving also increases even by a small current, and when the sizes of the first and second permanent magnets 23, 24 are constantly configured, the OIS driving may increase, as a current increases that flows in first and second coils 31a, 32a arranged at a position corresponding to that of the first and second permanent magnets 23, 24. In conclusion, although the OIS driving grows better as the sizes of the first permanent magnets 23 and second permanent magnets 24 increase, an optimum size may be designed within other design-allowable scopes.

The yoke 25 may be interposed between the first and second permanent magnets 23, 24. The yoke 25 may also protrusively provided at an approximate center to allow the magnetic force of the first and second permanent magnets 23, 24 to be projected into an inner space of the holder module 30. Preferably, the yoke 25 may be provided in a same width as that of the first and second permanent magnets 23, 24 and the yoke 25 is protruded at a center with a predetermined size to allow the permanent magnets and the yoke 25 to have an approximate "T" shape.

The holder module 30 is spaced apart from an inner bottom surface of the housing unit 20 at a predetermined distance, and may include an outer blade 31 and a bobbin 32. The holder module 30 may perform a pendulum movement to horizontal, vertical and diagonal directions while being suspended from the wire spring 60.

Elastic members 35, 36 may be provided at an upper and bottom surfaces of the outer blade 31, where vertical movement of the bobbin 32 may be elastically supported by the elastic member 35.

Referring to FIG. 1 again, the outer blade 31 is wound at four lateral peripheries with a total of four first 31a, 31b, 31c, 31d, and four lateral centers wound with the coils 31a, 31b, 31c, 31d may be open without the coils. The yoke 25 may be arranged at a position corresponding to the open space to allow the yoke 25 to be partially inserted into the open space.

The outer blade 31 is fixed at a bottom surface with the plate member 40 using a fixing member 33 such as a double-sided tape or an adhesive. The outer blade 31 may be discretely arranged from a bottom surface of the first housing 21 while being suspended from a plurality of wire springs 60 to allow horizontally and vertically or diagonally moving as illustrated in FIG. 2 by the magnetic force of the first and second permanent magnets 22, 23 and interaction of the first coils 31a, 31b, 31c, 31d. Furthermore, the outer blade 31 may be provided with a plurality of spring through holes 37 through which the wire spring 60 passes to be connected to the plate member 40.

The bobbin 32 is horizontally arranged at an inner surface of the outer blade 31, and may be mounted at an inner surface with at least one sheet of lens 34. The bobbin 32 is wound at a periphery with a second coil 32a, where the second coil 32a functions to lift up or lift down the bobbin 32 in response to interaction with the magnetic force projected through the open space of the yoke 25 where no first coils 31a~31d of the outer blade 31 are available.

Although the bigger size of the yoke 25 increases an AF driving, the size of the yoke 25 may be also changed based on optimal design value. As noted from the foregoing, it is possible to automatically adjust a focus of an image transmitted to the image sensor 11 by the lift operation of the bobbin 32.

The plate member 40 is preferably formed with a conductive metal material, and may be connected to the wire spring 60 to allow a power to be supplied to the first and second coils 31a, 32a by being arranged at a bottom surface of the outer blade 31. The connection method may be by way of soldering or other conductive materials. The present disclosure is not limited thereto and any methods may be applicable.

That is, as illustrated in FIG. 2, a connection portion w' of the plat member 40 is respectively connected to the first and second coils 31a, 32a to form an electromagnetic force by transmitting the power supplied from the wire spring 60 to the first and second coils 31a, 32a.

At this time, the second coil 32a may be directly connected to the plate member 40, or the second coil 32a may be first connected to the bottom spring 36 before the bottom spring 36 is connected to the plate member 40.

The second PCB 50 is fixed to an upper portion of the second housing 32 using a fixing member such as a double-sided tape or an adhesive, where a power transmitted through a terminal unit 52 of the second PCB 50 connected to the first PCB 10 may be transmitted to the plate member 40 through the wire spring 60 connected to the plate member 40. The connection method may be by way of soldering or by way of using a conductive material, and whichever method is useable.

Referring to FIGS. 3 and 4, the second PCB 50 is provided to cover a wall surface at one side of the first and second housings 21, 22, where a window 55 may be formed at a surface opposite to the first and second permanent magnets 23, 24 and the yoke 25 to avoid any interference with the first and second permanent magnets 23, 24 and the yoke 25. This configuration is made to avoid interference because the first and second permanent magnets 23, 24 and the yoke 25 are directly attached to a shield can described later using fixing means such as epoxy.

Meanwhile, the second PCB 50 may be an FPCB Flexible Printed Circuit Board, a PCB or R-FPCB Rigid FPCB, but the present disclosure is not limited thereto, and any substrate that can be electrically connected may be useable. The plate member 40 in the exemplary embodiment of the present disclosure may be provided with a cushioning unit configured to absorb an external shock from the connection unit w' soldered by the wire spring 60.

The wire spring 60 may be connected at both distal ends to the plate member 40 and the second PCB 50. At this time, one distal end of the wire spring 60 is connected to the second PCB 50, and the wire spring 60 connected to the second PCB 50 may supply a power received from the terminal unit 52 to the plate member 40 side, as illustrated in FIG. 2, whereby the first and second coils 31a, 32a can be interacted with the first and second permanent magnets 23, 24.

Furthermore, the other distal end of the spring wire 60 may pass the spring through hole 37 formed at the outer blade 31 to be connected to the plate member 40 installed on a bottom surface of the outer blade 31, as illustrated in FIG. 2. At this time, the other distal end of the wire spring 60, albeit not being shown, is connected to a pad not shown formed at the plate member 40, where the pad not shown may be centrally formed with a through hole not shown through which the wire spring 60 passes. The connection method may include any methods that can be connected by way of soldering or other conductive materials.

According to this configuration, the outer blade 31 may be suspended from the wire spring 60 to be spaced apart from a bottom surface of the first housing 21 at a predetermined distance. Then, the outer blade 31 may perform a pendular movement in response to interactions between the first and second permanent magnets 23, 24 and the first coil 31a, whereby the vibration of the outer blade 31 caused by handshake can be compensated by the interactions between the first and second permanent magnets 23, 24 and the first coil 31a. To this end, the wire spring 60 may be provided with a conductive metal material having elasticity to withstand shocks.

Meantime, thinner thickness of the wire spring 60 may have better handshake compensation movability, but the thickness of the wire spring 60 may vary depending on optimal design value. Preferably, the thickness of the wire spring 60 may be in the range of several pm to several hundreds μm, and more preferably in the range of 1 μm to 100 μm.

Furthermore, at least six wire springs 60 are preferably provided to supply, to the holder module, two polarity powers for auto focus control and four polarity powers for handshake compensation via connection with the second PCB 50 and the plate member 40.

According to the exemplary embodiment of the present disclosure, as illustrated in FIGS. 1 and 2, a total of eight wire springs are preferably provided, where a set of two wire springs is respectively arranged at each corner portion of the holder module 30, each at a same length.

Meanwhile, as illustrated in FIG. 2, when the camera module according to the exemplary embodiment of the present disclosure further include a separate third housing such as a shield can, the second PCB 50 may form a window 55 to cover a lateral wall of the first and second housings 21, 22, in order to avoid a coupled portion of the first/second permanent magnets 23, 24 and the yoke 25 to a shield can 70 using an epoxy.

In a case of a configuration where the shield can 70 is deleted, the second PCB 50 may be formed by a PCB, the first/second permanent magnets 23, 24 and the yoke 25 may be attached to and fixed on an inner surface of the PCB. When the second PCB 50 is formed by the PCB, the window 55 is provided as mentioned above, and the first/second permanent magnets 23, 24 and the yoke 25 may be inserted into the window 55, and a shielding tape may be additionally configured for reinforcement to an outside.

The characteristic of the exemplary embodiment of the present disclosure lies in configuration of a coil fixing unit 100 configured to fix the first coils 31a~31d fixed and attached to a periphery of the outer blade 31 forming the holder module 30.

The coil fixing unit 100 according to the exemplary embodiment of the present disclosure may include a plurality of fixing protrusions 110, a coil reception groove 120 and an adhesive input groove 130.

Referring to FIG. 5, the fixing protrusion 110 is protrusively formed on a periphery of the outer blade 31 at a predetermined height, and a pair of fixing protrusions 110 may be symmetrically formed as shown in FIG. 5. Each of the fixing protrusions may have a corresponding size, and may be spaced apart at a predetermined distance to allow a circumferential surface 111 of the fixing protrusion 110 to support an inner surface of a through hole 112 centrally formed at the first coils 31a~31d according to the exemplary embodiment of the present disclosure.

The coil reception groove 120 may be provided in a shape corresponding to that of the first coils 31a~31d, and may be formed to have a predetermined depth at a periphery of the outer blade 31. The coil reception groove 120 may perform the functions of guiding an accurate assembly position of the first coils 31a~31d and of preventing first coils 31a~31d from being disengaged from the outer blade 31.

The adhesive input groove 130 may be provided at a space formed by the fixing protrusions 110. According to the exemplary embodiment of the present disclosure, the adhesive input groove 130 may be formed more concave than a contact surface of the first coils 31a~31d of the coil reception groove 120. Furthermore, as illustrated in FIG. 5, a width of the adhesive input groove 130 may be formed to correspond to that of the fixing protrusion 110.

According to the abovementioned configuration, an area contacted by the coil reception groove 120 and the first coils 31a~31d may be maximally maintained. A depth of the adhesive input groove 130 may have a value smaller than a protruding height of the fixing protrusion 110.

Meanwhile, the adhesive input groove 130 may have a rectangular shape, and when the outer blade 31 is provided with a rectangular shape, the adhesive input groove 130 may have a same size on each surface mounted with the first coils 31a~31d. The adhesive input groove 130 may be also formed with a same size on each surface opposite to the outer blade 31, because the first coils 31a~31d mounted on each surface opposite to the outer blade 31 are symmetrically arranged with the same size. However, the present disclosure is not limited thereto, and different sizes may be formed, if necessary.

According to the abovementioned configuration, and as illustrated in FIG. 6, when an adhesive 200 is infused into the adhesive input groove 130, the adhesive 200 is completely filled in an entire inner area of an through hole 112 centrally and penetratively formed at the first coils 31a~31d to provide a coupling binding force through the adhesive flowing into a fine gap formed between a surface opposite to the first coils 31a~31d of the coil reception groove 120 and a surface opposite to the first coils 31a~31d.

Of course, although the adhesive 200 may be coated on a surface opposite to the first coils 31a~31d of the coil reception groove 120 without the adhesive reception groove 130, it would be difficult to provide a sufficient coupling force under a temporary fixing state in which a thermal curing process is not completed, because the adhesive 200 generally uses a thermally curing epoxy resin material.

Although only method to provide a sufficient coupling force under this configuration is to increase an amount of adhesive 200, there is a disadvantage of overflowed adhesive contaminating surrounding elements, and of degrading the performance of the first coils 31a~31d after the adhesive 200 is cured.

However, according to the exemplary embodiment of the present disclosure, the first coils 31a~31d are initially and temporarily fixed by being inserted into the coil reception groove 120 having a predetermined depth, and the adhesive input groove 130 formed deeper than the coil reception groove 120 is formed at an approximate center of the first coils 31a~31d to allow a sufficient amount of adhesive 200 to be infused into the adhesive input groove 130, whereby the first coils 31a~31d are prevented from being disengaged from an installed position when the camera module is assembled under a temporary fixing state.

Meanwhile, the camera module according to the exemplary embodiment of the present disclosure may further include a shield can 70 formed with a through hole at a position corresponding to a connection portion w between the second PCB 50 and the wire spring 60, and at a position corresponding to a position of the holder module to thereby wrap the housing units 21, 22.

In this case, as explained above, the second PCB 50 may be attached and fixed on an inner surface of the shield can 70. Meantime, the shield can 70 is not a necessity, and may be omitted depending on configuration of the housing units 21, 22.

Meanwhile, as illustrated in FIG. 2, a hook unit 80 may be formed on four surfaces or at least one surface in order to fix the shield can 70 to the first housing 21. The installed position may be in a center or at a margin within an allowable design, and one or a plurality of hook units 80 may be provided.

The hook unit 80 may include a hook 81 protrusively formed on the first housing 21, and a hook hole 82 penetratively formed at the shield can 70 opposite to the hook 81, or the hook unit 80 may include the hook 81 and the hook hole 82 each formed at an alternative position, if necessary.

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:
1. A camera module, the camera module comprising:
 a first PCB (Printed Circuit Board) mounted with an image sensor;
 a housing unit arranged on an upper portion of the first PCB;
 a holder module spaced apart from an inner bottom surface of the housing unit at a predetermined distance, wound on a periphery with a first coil and having at least one lens thereinside;
 a second PCB mounted on an upper portion of the holder module;
 a plate member coupled to a bottom surface of the holder module;

a plurality of wire springs connected at one end to the second PCB and connected at the other end to the plate member; and a coil fixing unit configured to fixedly position the first coil to a periphery of the holder module, wherein the coil fixing unit comprises a plurality of fixing protrusions each formed at a periphery of the holder module, a coil reception groove formed at the periphery of the holder module to have a first depth, and an adhesive input groove formed between the fixing protrusions to have a second depth.

2. The camera module of claim 1, wherein the holder module includes an outer blade configured to be wound with the first coil at a periphery, and a bobbin centrally arranged at the outer blade, arranged with the lens at an inside and fixed with a second coil at a periphery.

3. The camera module of claim 1, wherein the fixing protrusion is insertedly coupled to a through hole centrally formed at the first coil.

4. The camera module of claim 3, wherein the adhesive input groove is formed at a position corresponding to that of the through hole.

5. The camera module of claim 1, wherein an adhesive inputted to the adhesive input groove is infused into a space formed between the coil reception groove and the first coil.

6. The camera module of claim 2, wherein the holder module includes upper and bottom elastic members each arranged at an upper surface and a bottom surface of the bobbin to elastically support the bobbin relative to the outer blade, and a space formed at a center of the first coil to project a magnetic force toward the second coil.

7. The camera module of claim 1, wherein the wire spring is provided in a metal material and conductively connected to second PCB and the plate member.

8. The camera module of claim 7, wherein a total of eight wire springs are provided, where a set of two wire springs is respectively arranged at each corner portion of the holder module, each at a same length.

9. The camera module of claim 1, wherein the second depth is deeper than the first depth.

10. A camera module, the camera module comprising:
a first PCB (Printed Circuit Board) mounted with an image sensor;
a housing unit arranged on an upper portion of the first PCB;
a holder module spaced apart from an inner bottom surface of the housing unit at a predetermined distance, wound on a periphery with a first coil and having at least one lens thereinside;
a second PCB mounted on an upper portion of the holder module;
a plate member coupled to a bottom surface of the holder module;
a plurality of wire springs connected at one end to the second PCB and connected at the other end to the plate member; and
a coil fixing unit configured to fixedly position the first coil to a periphery of the holder module,
wherein the housing unit includes a first housing arranged at an upper portion of the first PCB, a second housing arranged on the upper portion of the first PCB and mounted an upper surface with the second PCB, first and second permanent magnets interposed between the first and second housings, and a yoke arranged between the first and second permanent magnets, or positioned between inner surfaces of the first and second housings to transmit a magnetic force into the holder module.

11. The camera module of claim 10, wherein the yoke is protrusively formed at a center portion facing the holder module.

12. The camera module of claim 10, wherein the second housing and the second PCB are fixed by using a double-sided tape.

13. The camera module of claim 10, further comprising a shield can formed with a through hole at a position corresponding to a connection portion between the second PCB and the wire spring, and at a position corresponding to a position of the lens module to thereby wrap the housing unit.

14. A camera module, the camera module comprising:
a first PCB (Printed Circuit Board) mounted with an image sensor;
a housing unit arranged on an upper portion of the first PCB;
a holder module spaced apart from an inner bottom surface of the housing unit at a predetermined distance, wound on a periphery with a first coil and having at least one lens thereinside;
a second PCB mounted on an upper portion of the holder module;
a plate member coupled to a bottom surface of the holder module;
a plurality of wire springs connected at one end to the second PCB and connected at the other end to the plate member; and
a coil fixing unit configured to fixedly position the first coil to a periphery of the holder module,
wherein at least six wire springs are provided to supply to the holder module two polarity powers for auto focus control and four polarity powers for OIS (Optical Image Stabilization) driving via connection with the second PCB and the plate member.

* * * * *